United States Patent Office 3,244,767
Patented Apr. 5, 1966

3,244,767
POLYMERIZATION PROCESS USING OXYGENATED SULFUR-PHOSPHORIC ACID CATALYST
William G. Nixon, Westchester, Ill., assignor to Universal Oil Products Company, Des Plaines, Ill., a corporation of Delaware
No Drawing. Filed Jan. 24, 1964, Ser. No. 339,878
6 Claims. (Cl. 260—683.15)

This invention relates to a process for the conversion of unsaturated organic compounds and more particularly relates to a process for polymerizing unsaturated organic compounds. More specifically, this invention is concerned with a process for the polymerization of olefinic hydrocarbons into more useful compounds utilizing a novel catalytic composition of matter.

The conversion of unsaturated hydrocarbons and particularly a process for polymerizing these compounds is especially useful in modern day technology. For example, gaseous olefins such as ethylene, propylene, the butylenes, etc., may be polymerized to produce polymers which are useful in many different and varied fields of chemistry, a particularly useful example being the polymerization of propylene and the butylenes to form liquid polymers useful as a fuel such as gasoline. In addition, propylene may be polymerized to form propylene trimer, tetramer, or pentamer which may be used as alkylating agents for aromatic compounds to produce intermediates useful as detergents and surface active agents. Other polymers may be used as intermediates in the preparation of long chain alcohols which are useful as solvents, plasticizer intermediates, and the like.

It is therefore an object of this invention to provide a process for converting unsaturated organic compounds to form useful compositions of matter.

A further object of this invention is to provide a process for converting olefinic hydrocarbons to polymers thereof in the presence of a novel catalytic composition of matter.

One embodiment of this invention resides in a process for the polymerization of an unsaturated organic compound which comprises contacting said compound at polymerization conditions with a substantially anhydrous catalyst prepared by combining a phosphoric acid-containing composite with an oxide of sulfur to effect chemical combination of the phosphoric acid portion of said composite with said oxide of sulfur.

A further embodiment of this invention resides in a process for the polymerization of an unsaturated organic compound which comprises contacting said compound at polymerization conditions with a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

A still further embodiment of this invention is found in a process for the polymerization of an olefinic hydrocarbon which comprises contacting said olefinic hydrocarbon at polymerization conditions including a temperature in the range of from about 0° to about 300° C. and a pressure in the range of from about atmospheric to about 200 atmospheres with a substantially anhydrous catalyst prepared by combining a phosphoric acid-containing composite with an oxide of sulfur selected from the group consisting of sulfuric acid, sulfurous acid, amonium oxides of sulfur and metallic oxides of sulfur to effect chemical combination of the phosphoric acid portion of said composite with said oxide of sulfur.

A specific embodiment of the invention resides in a process for the polymerization of isobutylene which comprises contacting said isobutylene at polymerization conditions including a temperature in the range of from about 0° to about 300° C. and a pressure in the range of from about atmospheric to about 200 atmospheres with a substantially anhydrous catalyst prepared by combining a phosphoric acid-containing composite with an oxide of sulfur selected from the group consisting of sulfuric acid, sulfurous acid, ammonium oxides of sulfur and metallic oxides of sulfur to effect chemical combination of the phosphoric acid portion of said composite with said oxide of sulfur.

A more specific embodiment of the invention resides in a process for the polymerization of propylene which comprises contacting said propylene at polymerization conditions including a temperature in the range of from about 0° to about 300° C. and a pressure in the range of from about atmospheric to about 200 atmospheres with a substantially anhydrous catalyst prepared by combining a phosphoric acid-containing composite with an oxide of sulfur derived from ammonium sulfate to effect chemical combination of the phosphoric acid portion of said composite with said oxide of sulfur.

Other objects and embodiments referring to alternative unsaturated organic compounds and to alternative catalytic compositions of matter will be found in the following further detailed description of the invention.

It has now been discovered that unsaturated organic compounds and particularly olefinic hydrocarbons may be converted to other and more useful compounds by contacting said olefinic hydrocarbons with certain catalytic compositions of matter which are prepared by specific methods. Examples of olefinic hydrocarbons which may be converted according to the process of this invention include monoolefins such as ethylene, propylene, 1-butene, 2-butene, 2-methyl-1-butene, 2-methyl-2-butene, 1-pentene, 2-pentene, 3-pentene, 2-methyl-1-pentene, 3-methyl-1-pentene, 2-methyl-2-pentene, 3-methyl-2-pentene, 1-hexane, 2-hexene, 3-hexene, 2-methyl-1-hexene, 3-methyl-1-hexene, 4-methyl-1-hexene, 2-methyl-2-hexene, 3-methyl-2-hexene, 4-methyl-2-hexene, 2-methyl-3-hexene, 3-methyl-3-hexene, 1-heptene, 2-heptene, 3-heptene, 2-methyl-1-heptene, 3-methyl-1-heptene, 4-methyl-1-heptene, 2-methyl-2-heptene, 3-methyl-2-heptene, etc.; polyolefins such as 1,3-butadiene, 2-methyl-1,3-butadiene, 1,3-pentadiene, 2-methyl-1,3-pentadiene, 1,4-pentadiene, 2-methyl-1,4-pentadiene, 1,3-hexadiene, 1,4-hexadiene, 2-methyl-1,3-hexadiene, etc.; and cycloolefins such as cyclopentene, cyclohexene, cycloheptene, etc.

As hereinbefore set forth, the invention is concerned with a process for the conversion of unsaturated organic compounds and particularly the polymerization of olefinic hydrocarbons, said process being effected in the presence of a catalyst which possesses a high degree of hydrocarbon conversion activity and is particularly effective as a polymerization catalyst for unsaturated compounds, a representative number of which are hereinabove set forth. The catalyst comprises a phosphoric acid-containing composite that is combined with an oxide of sulfur to effect chemical combination of the phosphoric acid portion of said composite with said oxide of sulfur. The composite, if desired, may comprise a high surface area solid support although it is one of the features of the catalyst of the present invention that low surface area supports such as alpha-alumina are satisfactory for the preparation of catalysts for use in the process of this invention as contrasted to hydrocarbon conversion catalysts prepared by chemically combining only an oxide of sulfur with alpha-alumina, said alpha-alumina in the latter case being an unsatisfactory support for the oxide of sulfur alone.

As set forth hereinabove, the support may comprise a high surface area support. By the term high surface area is meant a surface area measured by surface absorption techniques within the range of from about 25 to about 500 or more square meters per gram and preferably a support having a surface area of approximately 100 to 300 square meters per gram. However, as set forth hereinbefore, alpha-alumina, which is usually characterized by a surface area ranging from about 10 to about 25 square meters per gram is also a satisfactory support. Therefore, satisfactory supports for the preparation of catalysts for use in the process of this invention include high surface area crystalline alumina modifications such as gamma-, eta- and theta-alumina and low surface area supports such as alpha-alumina, although these are not necessarily of equivalent suitability. In addition to the aforementioned alpha-, gamma-, eta- and theta-aluminas which may be utilized as solid supports, it is also contemplated that other refractory oxides such as silica, zirconia, magnesia, thoria, etc. and combinations of refractory oxides such as silica-alumina, silica-magnesia, alumina-silica-magnesia, alumina-thoria, alumina-zirconia, etc. may also be utilized as solid supports for the catalyst of the present invention.

As set forth hereinabove, the catalyst comprises a phosphoric acid-containing composite that is combined with an oxide of sulfur to effect chemical combination of the phosphoric acid portion of said composite with said oxide of sulfur. The phosphoric acid-containing composite may be made by combining an acid of phosphorus such as ortho-, pyro-, or tetraphosphoric acid with the solid support. Orthophosphoric ($H_3PO_4$) and pyrophosphoric acid ($H_4P_2O_7$) find general application due mainly to the cheapness and to the readiness with which they may be procured although the invention is not restricted to their use, but may employ any of the other acids of phosphorus insofar as they are adaptable. However, it is not intended to infer that the different acids of phosphorus which may be employed will produce catalysts which have identical effects upon any given organic reactions as each of the catalysts produced from different acids and by slightly varying procedures will exert its own characteristic action.

Triphosphoric acids, which may be represented by the formula $H_5P_3O_{10}$, may also be used as one of the starting materials for the preparation of the composite utilized in the catalyst of this invention.

A phosphoric acid mixture which is generally referred to as polyphosphoric acid may also be employed in manufacturing the composite. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79% to about 85% by weight of $P_2O_5$.

Tetraphosphoric acid, having the general formula $H_6P_4O_{13}$ which corresponds to the double oxide formula $3H_2O \cdot 2P_2O_5$ may be considered as the acid resulting when three molecules of water are lost by four molecules of orthophosphoric acid, $H_3PO_4$. The tetraphosphoric acid may be manufactured by gradual or controlled dehydration or heating of orthophosphoric acid and pyrophosphoric acid or by adding phosphorus pentoxide to these acids in proper amounts.

The phosphoric acid-containing composite utilized in the present invention may contain from about 8% or lower to about 80% by weight of phosphoric acid, and preferably from about 10% to about 50% by weight of phosphoric acid. Prior art solid phosphoric acid catalytic composites usually contain from about 50 to about 75% by weight of phosphoric acid composited with the solid carrier since lower acid contents cause the solid phosphoric acid catalytic composite to suffer from a hydrocarbon conversion activity standpoint while those with too high a content of phosphoric acid have poor structural strength. Solid phosphoric acid catalytic composites have been manufactured by prior art methods with from about 15% to about 75% by weight of phosphoric acid but compression pressures ranging from about 5,000 to about 50,000 pounds per square inch during the manufacturing process have been found necessary to give the catalyst increased structural strength.

It is therefore a feature of the present invention that the phosphoric acid-containing composite utilized in the present invention may contain less than about 50% by weight of phosphoric acid without causing the hydrocarbon conversion activity of the finished catalyst to suffer and without the need for subjecting the composite to high compression pressures during manufacture in order to give the catalyst increased structural strength inasmuch as the finished catalyst of the present invention prepared as hereinafter set forth has increased structural strength and a high degree of stability due to the immobility of the components of the finished catalyst inasmuch as chemical combination of the phosphoric acid portion of the composite with the oxide of sulfur is accomplished as hereinafter described.

Oxides of sulfur which may be chemically bound to the phosphoric acid portion of the phosphoric acid-containing composite include metallic oxides of sulfur in which the metallic portion of the compound preferably comprises a metal of Group VI B of the Periodic Table, a metal of the Iron Group of Group VIII, as well as aluminum, etc. such as aluminum sulfate, nickel sulfate, nickel sulfite, chromium sulfate, chromium sulfite, molybdenum sulfate, tungsten sulfate, cobalt sulfate, cobaltous sulfite, ferric sulfate, ferric sulfite, etc. In addition to the hereinabove enumerated metallic oxides of sulfur it is also contemplated within the scope of this invention that the phosphoric acid-containing composite may be impregnated with a solution of ammonium sulfate or ammonium sulfite, or, if so desired, with a solution of sulfuric or sulfurous acid adjusted to a pH of about 9.0 by the addition of a sufficient amount of ammonium hydroxide. Following the impregnation, the phosphoric acid-containing support is then heat treated thereby driving off the ammonia and allowing the oxide of sulfur to remain impregnated on and chemically bonded to the phosphoric acid portion of the phosphoric acid-containing composite. The catalyst comprises an oxide of sulfur chemically combined with the phosphoric acid portion of the composite so as to effect chemical combination of the hydroxyl groups of the phosphoric acid with the oxide of sulfur, and as hereinbefore set forth, it is the particular association of these components which results in the unusual catalytic properties of this catalyst. In addition to the aforesaid oxides of sulfur, the phosphoric acid-containing composite may also be impregnated with concentrated sulfuric or sulfurous acid in an amount sufficient that the final catalytic composite possesses from about 1 to about 25% by weight of sulfate or sulfite content.

The chemical addition of the oxide of sulfur to the phosphoric acid portion of the phosphoric acid-containing composite will enhance the surface area characteristics of the composite inasmuch as the finished catalytic composite exhibits greater surface area than the phosphoric acid-containing composite originally possessed. Further, the final catalytic composite obtained by the preparation as described hereinabove is substantially anhydrous due to the chemical combination of the oxide of sulfur with the phosphoric acid-containing portion of the composite. Thus, it is another feature of the present invention that a substantially anhydrous support initially is not necessary to prepare the catalyst of the present invention. Still another feature of the present invention is that the final catalytic composite does not need hydration during processing as does a phosphoric acid-containing composite as is taught in the prior art inasmuch as the final catalytic composite is substantially anhydrous and thus deterioration of a physical nature by processing factors tending to further dry the catalyst is not a problem in the present invention.

As hereinbefore set forth, certain forms of alumina may be utilized as supports for the catalyst of this invention. For example, alumina may be prepared by any of the well known suitable means of manufacture, one example of which is the addition of an alkaline reagent to a salt of aluminum in an amount sufficient to form aluminum hydroxide, which, upon drying and calcining, is converted to alumina. Similarly, if the solid support comprises both alumina and silica, these components may be prepared by separate, successive or coprecipitate means.

For example, a phosphoric acid-containing composite previously prepared by the methods hereinbefore set forth is then chemically combined with an oxide of sulfur such as by treating the composite with an oxide of sulfur, said oxide of sulfur being added in an amount sufficient to allow the finished catalytic composite to contain from about 1.0 to about 25% or more by weight of sulfate or sulfite. Following this, the chemically combined material is then dried by heat treatment in a furnace tube or muffle furnace, etc. The finished catalytic composite comprising the oxide of sulfur chemically combined with the phosphoric acid portion of the phosphoric acid-containing composite is then utilized as the conversion catalyst.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the unsaturated organic compound to be polymerized is continuously charged to a reaction zone containing a fixed bed of the desired catalyst, said zone being maintained at the proper operating conditions of temperature and pressure including a temperature in the range of from about 0° to about 300° C., and preferably in the range of from about 40° C. to about 180° C., and a pressure in the range of from about atmospheric to about 200 atmospheres and at a liquid hourly space velocity (the volume of charge per volume of catalyst per hour) in the range of from about 0.1 to about 20 or more, and preferably in a range of from 0.1 to about 10, or at a gaseous hourly space velocity in the range of from about 100 to about 1500 or more. The reaction zone may comprise an unpacked vessel or coil or may be lined with an adsorbent packing material. The unsaturated organic compound to be polymerized passes through the catalyst bed in either an upward or downward flow and the polymerized product is continuously withdrawn, separated from the reactor effluent, and recovered, while any unreacted starting materials may be recycled to form a portion of the feed stock. Another continuous type operation comprises the moving bed type in which the unsaturated organic compound and the catalyst bed move either concurrently or countercurrently to each other while passing through said reaction zone. Yet another continuous type of operation which may be used is the slurry type in which the catalyst is carried into the reaction zone as a slurry in the unsaturated organic compound to be polymerized.

Still another type of operation which may be used is the batch type operation in which a quantity of the unsaturated organic compound and the catalyst are placed in an appropriate apparatus such as, for example, a rotating or stirred autoclave. The apparatus is then heated to the desired temperature and maintained thereat for a predetermined residence time at the end of which time the vessel and contents thereof are cooled to room temperature and the desired reaction product recovered by conventional means such as for example, by washing, drying, fractional distillation, crystallization, etc.

The following examples are introduced for the purpose of illustration only with no intention of unduly limiting the generally broad scope of the present invention.

*Example I*

In this example, polyophosphoric acid is treated with ammonium hydroxide to a pH of approximately 9.0 and this solution is impregnated on the solid support, namely gamma-alumina. The impregnated support is then heated in a furnace tube to a temperature of about 500° C. and maintained at this temperature for a period of about two hours while heat treating the composite. During the heat treatment of the composite to the desired temperature, it will be noted that ammonia gas is evolved from the composite thereby leaving phosphoric acid deposited on the refractory oxide support. This phosphoric acid-containing composite containing approximately 50% by weight of phosphoric acid is then subjected to chemical reaction at a temperature in the range of from about 300° C. to about 600° C. with an oxide of sulfur, namely sulfur trioxide. The finished catalyst will contain about 8.5 weight percent of sulfate (which is approximately 2.8 weight percent sulfur). This catalyst is designated as catalyst "A."

*Example II*

Another catalyst is prepared by impregnating silica with another polyphosphoric acid-ammonium hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 30% by weight of phosphoric acid is then subjected to substantially complete chemical reaction with an oxide of sulfur derived from sulfuric acid. The composite is subjected to an impregnation with 85 cc. of a solution containing 10 cc. of concentrated sulfuric acid which has been adjusted to a pH of 9.0 with ammonium hydroxide. The resultant composite is again slowly heat treated in the furnace tube to about 600° C. and once again the evolution of ammonia gas takes place leaving the oxide of sulfur chemically combined with the phosphoric acid portion of the silica support. This catalyst is designated as catalyst "B."

*Example III*

Yet another catalyst is prepared by impregnating silica with another polyphosphoric acid-ammonia hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 25% by weight of phosphoric acid is then subjected to chemical reaction with an oxide of sulfur derived from aluminum sulfate. The composite is then subjected to an impregnation with a 20% aluminum sulfate solution. The resultant composite is again slowly heat treated in the furnace tube to about 600° C. and chemical combination of the oxide of sulfur and the phosphoric acid portion of the silica support occurs. This catalyst is designated as catalyst "C."

*Example IV*

In this example, a catalyst is prepared by impregnating alumina with another polyphosphoric acid-ammonium hydroxide solution. The impregnated support is then heat treated in a furnace tube to a temperature of about 500° C. and kept thereat for a period of about two hours. It is noted that ammonia gas is evolved from the composite thereby leaving phosphoric acid deposited on the refractory oxide support. This phosphoric acid-containing composite containing approximately 38% by weight of phosphoric acid is then subjected to chemical reaction with an oxide of sulfur derived from ammonium sulfate. The composite is subjected to an impregnation with a 20% ammonium sulfate solution. The resultant composite is again slowly heat treated in the furnace tube to about 600° C. and once again the evolution of ammonia gas takes place leaving the oxide of sulfur chemically combined with the phosphoric acid portion of the alumina support. This catalyst is designated as catalyst "D."

*Example V*

The catalyst prepared according to Example I above and designated as catalyst "A" is utilized in a polymerization reaction zone to determine the polymerization activity of said catalyst. In this experiment, 100 grams of the catalyst prepared according to the method of Example I is placed in the reaction zone which is provided with heating means. In the experiment, a 1:1 molar propane-propylene mixture is charged to the polymerization reactor. The reactor is maintained at about 1,000 p.s.i.g. and about 140° C. Based on weight, about 85% olefin conversion is obtained. The liquid product is analyzed using gas-liquid chromatography and it is found that the product comprises about 70% propylene trimer, 20% propylene tetramer, and 10% intermediate and higher cuts.

*Example VI*

The catalyst prepared according to Example II and designated as catalyst "B" is utilized in a polymerization reaction zone, 100 grams of the finished catalyst being placed in the polymerization apparatus. In the experiment, a 1:1 molar butylene-butane feed mixture is charged to the polymerization zone. Over 85% conversion of the olefin is obtained, the product comprising mainly octenes with small amounts of higher polymers.

*Example VII*

In this example, the catalyst prepared according to Example III and designated as catalyst "C" is utilized in the polymerization of propylene to determine the activity of said catalyst. In this experiment, 100 grams of the finished catalyst is placed in the same apparatus used previously. The 1:1 molar propane-propylene feed mixture again is charged to the polymerization reactor which is maintained at about 1200 p.s.i.g. and about 150° C. Substantial olefin conversion is again obtained.

*Example VIII*

The catalyst prepared according to Example IV above and designated as catalyst "D" is utilized in the polymerization reaction zone to determine the polymerization activity of said catalyst. In this experiment, 100 grams of the catalyst is placed in the appropriate apparatus which is provided with heating means. In the experiment, a 1:1 molar propane-propylene mixture is charged to the polymerization reactor which is maintained at about 1000 p.s.i.g. and about 150° C. Based on weight, approximately 85% olefin conversion is obtained. The liquid product is analyzed using gas-liquid chromatography and it is found that the product comprises about 70% propylene trimer, 20% propylene tetramer, and 10% intermediate and higher cuts.

I claim as my invention:

1. A process for the polymerization of an olefinic hydrocarbon which comprises contacting said hydrocarbon at a polymerizing temperature in the range of from about 0° to about 300° C. and a pressure in the range of from about atmospheric to about 200 atmospheres with a substantially anhydrous catalyst prepared by impregnating a refractory inorganic oxide support with a phosphoric acid, and heating the resulting phosphoric acid-containing composite with a compound containing oxygen and sulfur selected from the group consisting of sulfuric acid, sulfurous acid, and sulfates and sulfites of ammonium, aluminum and metals of Groups VI–B and VIII of the Periodic Table at a temperature of from about 300° C. to about 600° C. to chemically combine said compound with the phosphoric acid portion of said composite.

2. The process of claim 1 further characterized in that said compound containing oxygen and sulfur is sulfuric acid.

3. The process of claim 1 further characterized in that said compound containing oxygen and sulfur is ammonium sulfate.

4. The process of claim 1 further characterized in that said compound containing oxygen and sulfur is aluminum sulfate.

5. The process of claim 1 further characterized in that said olefinic hydrocarbon is a butene.

6. The process of claim 1 further characterized in that said olefinic hydrocarbon is propylene.

References Cited by the Examiner

UNITED STATES PATENTS

| | | | |
|---|---|---|---|
| 2,148,378 | 2/1939 | Malishev | 252—437 |
| 2,148,634 | 2/1939 | Malishev | 252—437 |
| 2,161,392 | 6/1939 | Stevens et al. | 260—683.15 |
| 2,199,180 | 4/1940 | Laughlin | 260—683.15 |
| 2,212,995 | 8/1940 | Wassermann | 260—683.15 |
| 2,572,724 | 10/1951 | Hinds et al. | 260—683.15 |

DELBERT E. GANTZ, *Primary Examiner.*

R. H. SHUBERT, *Assistant Examiner.*